Feb. 17, 1948. H. A. BENDFELT 2,436,032

MOTION PICTURE PROJECTION MACHINE

Filed Jan. 29, 1945 3 Sheets-Sheet 1

Inventor:
Herbert A. Bendfelt
By Carl S. Lloyd
Attorney

Feb. 17, 1948. H. A. BENDFELT 2,436,032
MOTION PICTURE PROJECTION MACHINE
Filed Jan. 29, 1945 3 Sheets-Sheet 2

Inventor:
Herbert A. Bendfelt
By Carl N. Lloyd
Attorney

Feb. 17, 1948. H. A. BENDFELT 2,436,032
MOTION PICTURE PROJECTION MACHINE
Filed Jan. 29, 1945 3 Sheets-Sheet 3
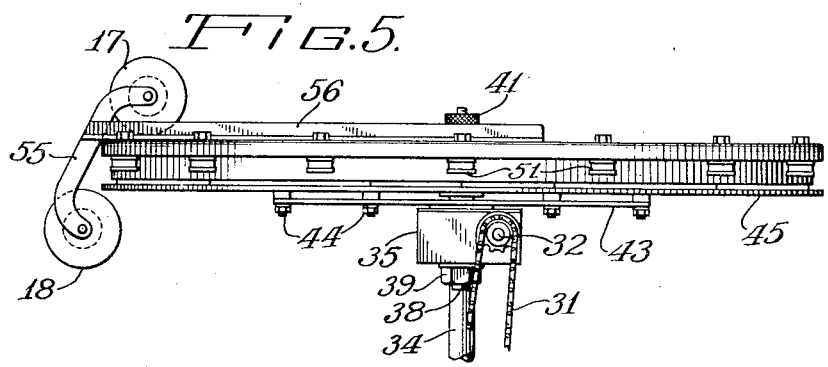
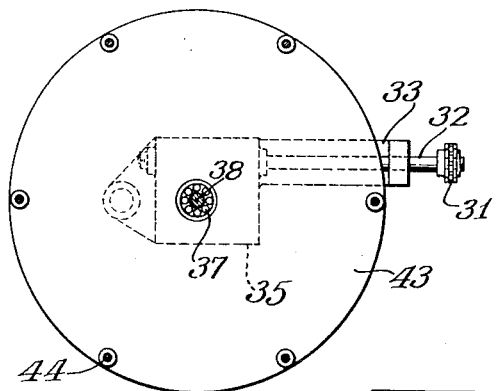
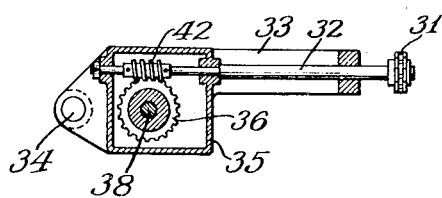
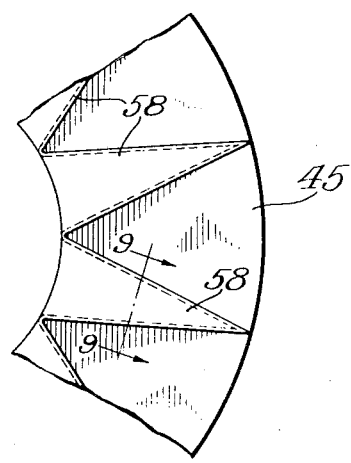
Inventor:
Herbert A. Bendfelt
By Carl A. Lloyd
Attorney Patented Feb. 17, 1948

2,436,032

UNITED STATES PATENT OFFICE 2,436,032

MOTION-PICTURE PROJECTION MACHINE

Herbert A. Bendfelt, Oak Park, Ill., assignor to Mills Industries, Incorporated, Chicago, Ill., a corporation of Illinois Application January 29, 1945, Serial No. 574,998

10 Claims. (Cl. 88—18.7)

This invention relates to motion picture projection machines of a type adapted for continuous operation through the use of an endless film wound in a coil upon a reel and arranged to be withdrawn from the inside of the coil and rewound on the outside thereof; and it is particularly concerned with the construction, mounting and control of the reel in such a machine.

In automatic, continuous reel, moving picture projection machines, with or without sound, it is desirable to have a reel that will automatically handle the film in large lengths (up to 2,000 feet or more) without breakage, scratching, kinking, or excessive pulling that might stretch, break, or otherwise damage the film. Also, the film should be readily responsive to the pull of the projector sprocket but should not be fed out faster than the projector uses it at any time, since this might cause it to pile up in a tangled mass and thereby cause machine failure and film breakage.

Both vertical and horizontal reels have been built but, due to the weight of the film, the vertical reels are limited to about 800 or 900 feet of film, whereas the horizontal reels built thus far either do not deliver the film fast enough to make it available to the projector under all conditions, or they deliver it too fast and thus cause it to tangle before it goes through the projector. In addition, these reels are, for the most part at least, far too complicated and expensive to build. Other horizontal reels are too large and odd shaped to be adapted to cabinets suitable for general use.

The present invention has for its general object the provision of a horizontal reel structure adapted to handle efficiently quantities of film ranging from, say, 200 to 2,000 feet or more, and which is yet simple in design and comparatively easy and inexpensive to manufacture.

A more specific object is to provide in a reel construction of this character means to equalize the frictional pull on the film of the supporting surface of the reel in all parts of said surface notwithstanding that the outer part of the reel of necessity has a greater rotary speed than the inner part. This results in constant linear speed of the film as it traverses such supporting surface from the outer to the inner diameter of the reel since the greater speed of the outer area of the reel is offset by providing less frictional pull on the film in that area than there would be without such equalizing means.

Other objects and advantages of the invention will be apparent from the following description taken in connection with the accompanying drawings, in which:

Fig. 5 is an elevational view of the reel and associated parts, taken substantially on the line 5—5 of Fig. 4;

Fig. 6 is a view taken substantially on the line 6—6 in Fig. 4, showing the rotatable supporting disc upon which the movable part of the reel is carried;

Fig. 7 is a horizontal sectional view of the reel drive taken substantially on the line 7—7 in Fig. 4;

Fig. 8 is an enlarged fragmentary plan view of the coil supporting part of the reel showing the star formation of the supporting surface; and Fig. 9 is a sectional view taken substantially on the section line 9—9 of Fig. 8.

Figure 1:
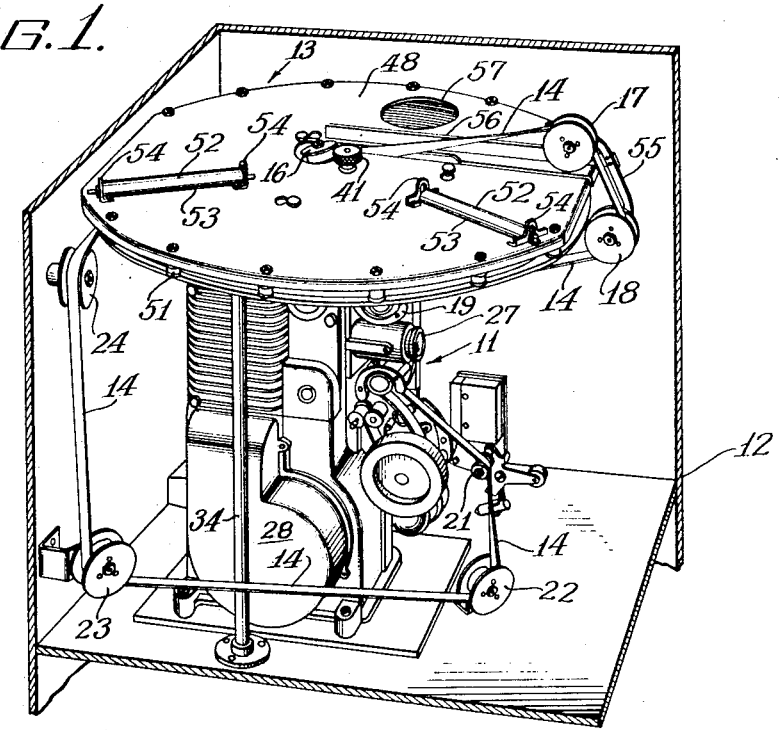
Fig. 1 is a perspective view of a motion picture projection machine in which my invention is embodied.
Figure 2:
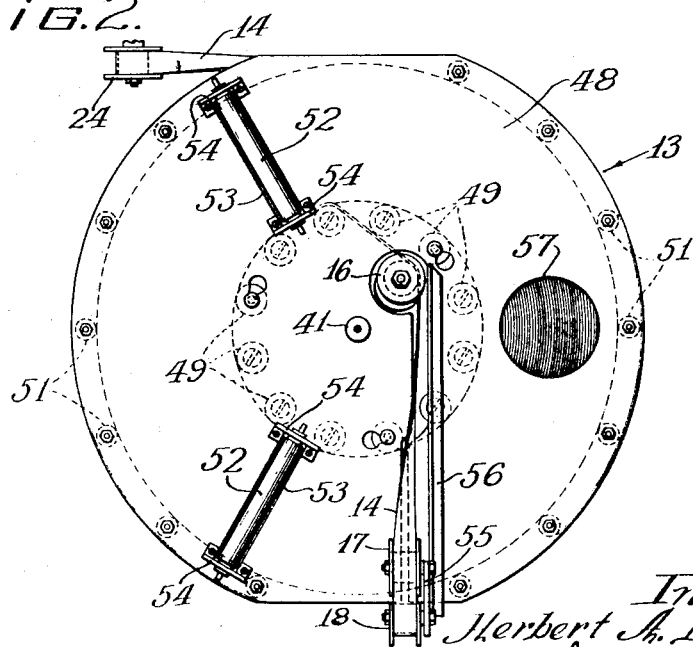
Fig. 2 is a top plan view of the reel of said machine.
Figure 3:
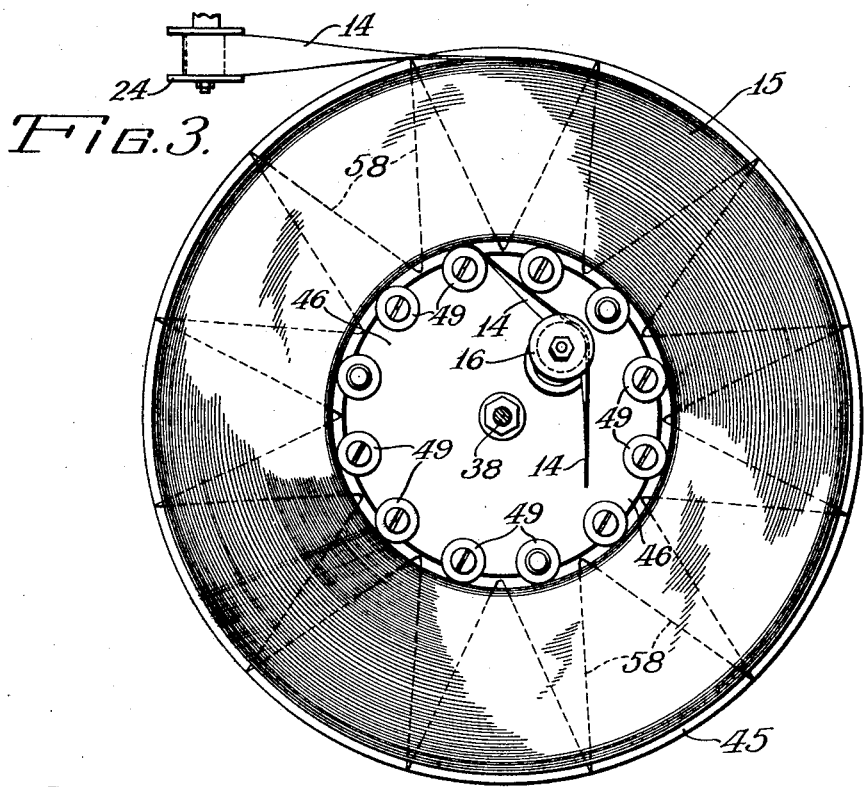
Fig. 3 is also a plan view of the reel but with the cover removed and showing in dotted lines the supporting surfaces for the film coil.
Figure 4:
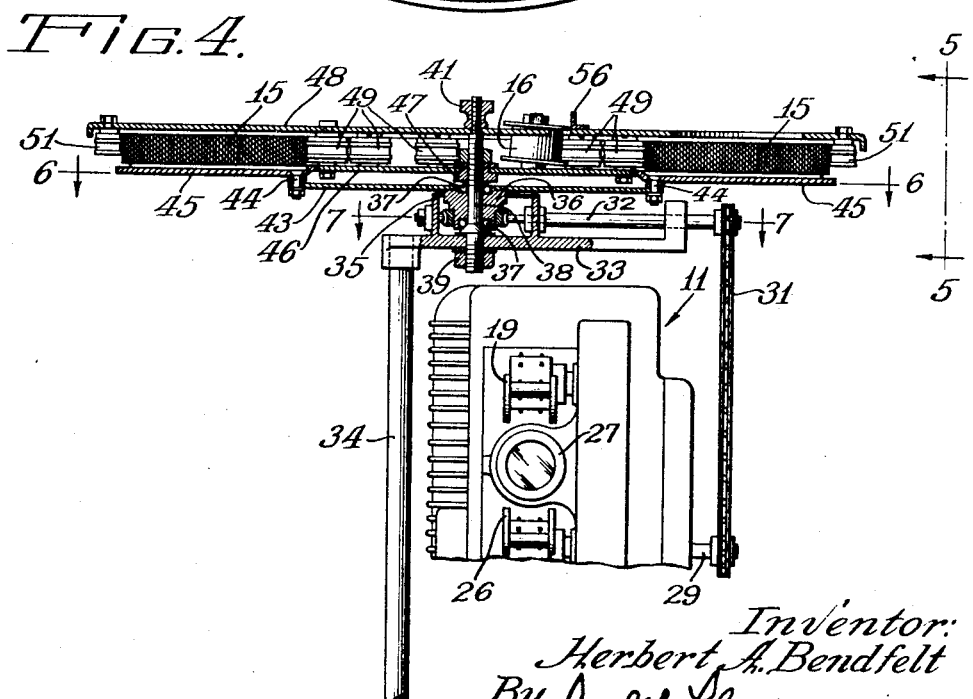
Fig. 4 is a vertical sectional view through the reel and the supporting means therefor, showing also in elevation a portion of the projector and the driving connection between the projector and the reel.

Referring first to Fig. 1, I have shown a projector, generally indicated at 11, mounted in a cabinet 12 and having a film-supporting reel 13 horizontally disposed above the projector. The film, indicated by the reference numeral 14, is coiled upon the reel, as shown at 15 in Fig. 3, and is adapted to be paid out from the center of the coil, drawn through the projector and rewound upon the outside of the coil, being an endless strip which may be thus unwound and rewound continuously so long as the machine is operating. Upon leaving the center of the coil the film passes over an obliquely mounted roller 16 and two horizontally mounted rollers 17 and 18, thence to a sprocket wheel 19 underneath the reel from which it passes through the projector. After leaving the projector it passes over a roller 21, angularly mounted rollers 22 and 23, a roller 24 and thence onto the periphery of the coil 15. The invention is not particularly concerned with the projector per se and the projector mechanism will therefore not be further described except to point out that the film is fed therethrough by means of the sprocket wheel 19 and a second sprocket wheel 26, said wheels being arranged respectively above and below the lens 27.

Said sprocket wheels are driven by suitable connection with a motor positioned in a housing 28. The shaft 29 on which the lower sprocket wheel is mounted has a chain and sprocket connection 31 with a reel drive shaft 32. Said shaft 32 has bearings in a bracket 33 which is supported from the base of the cabinet by means of posts 34 and has formed or mounted thereon a gear box 35 containing a worm wheel 36 mounted on roller bearings 37 on a fixed stud 38 extending through said gear box and through a fixed central portion of the reel, said stud having nuts 39 and 41 on the lower and upper ends thereof respectively to hold the reel structure in assembled relation upon the bracket 33. Said gear box 35 also contains a worm 42 carried by the drive shaft 32.

The worm wheel 36 has a disc 43 rigidly secured to the upper side thereof and said disc is secured by means of screws 44 to a ring disc 45 on which the film coil 15 is supported.

Within the central aperture of the ring disc 45 there is positioned a disc 46 which is fixedly secured to the stud 38 by means of a grooved collar 47, and a fixed cover plate 48 is mounted on the upper end of said stud 38. Said cover plate is of sufficient size to overlie both the disc 46 and the ring disc 45 and is positioned above the film coil 15 which is supported on said ring disc.

Rollers 49 are mounted between the disc 46 and the cover plate 48, and the film coil 15 is wound around these rollers. The cover plate 48 carries at its outer edge a series of depending rollers 51 which engage the outside of the coil 15 when a coil of maximum size is employed and in any event prevent any of the turns of the coil from sliding off the support 45.

For the purpose of holding the coil down upon said support 45, rollers 52 are provided in slots 53 in the cover plate 48, said rollers being journaled in ears 54 secured to the top of said plate.

The film 14 takes off the inside of the coil over one of the rollers 49 from which it is led to the angular guide roller 16 and the returning film is directed onto the periphery of the coil inside the rollers 51.

The rollers 17 and 18 are mounted on a bracket 55 carried at the outer end of a bar 56 secured to the top of the cover member 48.

An aperture 57 through which the film coil may be seen is provided in the cover member 48.

The film supporting ring disc 45 in the embodiment of the invention shown in the drawings has a plurality of raised portions 58 which are in the form of the points of a star, being thus of decreasing width from the inner to the outer edges of said ring disc. The purpose of this construction will appear when it is realized that the delivery of the film from the large diameter to the small diameter of the ring disc is accomplished by a pulling action on the bottom edge of the film on each turn of the film from the outside to the inside diameter. Since the speed of travel of the outer diameter of the wheel is of course greater than that of the inner diameter the amount of pulling on the film due to friction caused by the rotation of the wheel would increase from the inner diameter to the outer diameter if the coil were supported upon a uniform flat surface. By providing the star shaped raised surfaces or pads on the wheel the frictional pull on the edges of the film is equalized throughout all of the turns of the coil. This offsets the greater speed at the outer diameter of the wheel by reducing the friction in that area. Thus the film travels through the reel at a constant linear velocity with the points of the star sliding under the film coil and the bases of the star points carrying the film along with little or no sliding. In other words, the active friction area of the star points in contact with the film decreases as the diameter of the wheel increases, whereas the speed of the active friction area increases as the diameter of the wheel increases.

It will be evident that supporting surfaces in forms other than star points having a continuous surface could be employed to accomplish the same general result. For example, a series of ridges of varying length with only the longer ones extending to the outer part of the wheel, or a series of pads arranged in triangular form or otherwise so as to provide a greater relative area frictional contact with the inner part of the film coil than with the outer part, would be within the purview of the invention.

The rollers 49 upon which the inside of the film coil rides also tend to facilitate the rotation of the coil and the take off of the film therefrom, and it will be evident that the provision of the above described film-supporting surface, in conjunction with the rollers 49, results in a tension on the film as it takes off at the center of the reel being very light at all times. The rollers 51 are so arranged that one thereof may guide the film onto the periphery of the coil as it returns to the reel from the projector and, when a full-size coil is used, said rollers 51 facilitate the turning of the coil and hold it in proper relationship to the support and the inner rollers 49.

Since the reel is driven by interconnection with the drive shaft on which one of the film driving sprockets is carried, a predetermined speed relationship between these elements may be maintained with the result that the inner diameter of the film-supporting part of the reel may be caused to move at substantially the same speed as the linear speed of the film through the projector. It is thus impossible for the film to be delivered from the coil faster than the projector can use it, and piling up and tangling of the film between the reel and the projector is effectively prevented.

It will be understood that, while the sprockets 19 and 26 and the driving means therefor are referred to in the following claims as "means for feeding the film through the projector," the reel itself assists materially in the feeding action, since by reason of the frictional pull or traction of the supporting surface of the reel on the bottom of the turns of the film coil the latter are caused to traverse said supporting surface from the outer to the inner diameter so that the innermost turn will be subject to very little tension as it is paid out and it may therefore be readily drawn through the projector. This is an important feature of the invention.

The foregoing detailed description has been given for clearness of understanding only, and no unnecessary limitations should be understood therefrom, but the appended claims should be construed as broadly as permissible in view of the prior art.

I claim:

1. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a rigid supporting surface for a coil of film carried thereby providing relatively less area of frictional contact at any given instant between said supporting surface and said coil in the parts of the reel of greater diameter than in the parts thereof of lesser diameter.

2. In a motion picture projection machine, a projector, mechanism for feeding the film through said projector, and a rotatable reel from which an endless film may be continuously fed to the projector and onto which it may be rewound after passing through the projector, said reel being horizontally mounted in the machine above said projector and having a rigid supporting surface for a coil of film carried thereby providing relatively less area of frictional contact at any given instant between said supporting surface and said coil in the parts of the reel of greater diameter than in the parts thereof of lesser diameter.

3. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a star-shaped supporting surface for a coil of film carried thereby providing relatively less area of frictional contact between said supporting surface and said coil in the parts of the reel of greater diameter than in the parts thereof of lesser diameter.

4. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a supporting surface for a coil of film carried thereby providing relatively less area of frictional contact between said supporting surface and said coil in the parts of the reel of greater diameter than in the parts thereof of lesser diameter, and driving means for rotating said reel interconnected with said film feeding mechanism and maintaining a predetermined speed relationship between said reel and feeding mechanism.

5. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a supporting surface for a coil of film carried thereby providing relatively less area of frictional contact between said supporting surface and said coil in the parts of the reel of greater diameter than in the parts thereof of lesser diameter, driving means for rotating said reel interconnected with said film feeding mechanism and maintaining a predetermined speed relationship between said reel and feeding mechanism, and a series of stationary rollers engaging the inner turn of said film coil to facilitate the rotation of the coil and the take off of the film therefrom.

6. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a supporting surface for a coil of film carried thereby providing relatively less area of frictional contact between said supporting surface and said coil in the parts of the reel of greater diameter than in the parts thereof of lesser diameter, driving means for rotating said reel interconnected with said film feeding mechanism and maintaining a predetermined speed relationship between said reel and feeding mechanism, and two series of stationary rollers, one series engaging the inner turn of said coil to facilitate the rotation of the coil and the take off of the film therefrom and the other series preventing the coil from sliding off said supporting surface.

7. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a rigid supporting surface for a coil of film carried thereby providing in any position of said reel and supporting surface progressively less frictional contact at any given instant between said supporting surface and said coil, relative to their respective areas, from the central to the outer part of the reel.

8. In a motion picture projection machine, a projector, mechanism for feeding the film through said projector, and a rotatable reel from which an endless film may be continuously fed to the projector and onto which it may be rewound after passing through the projector, said reel being horizontally mounted in the machine above the projector and having a rigid supporting surface for a coil of film carried thereby providing progressively less frictional contact at any given instant between said supporting surface and said coil, relative to their respective areas, from the central to the outer part of the reel, means whereby the film is unwound from the center of the coil and rewound onto the exterior thereof, and means for driving said reel from said film feeding mechanism with the major part of the reel moving faster than the coil is moved on said portion of the reel by the pull on the film in the unwinding thereof.

9. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a rigid supporting surface for a coil of film carried thereby providing relatively less area of frictional contact at any given instant between said surface and coil in the outer part of the reel than in the inner part, the linear frictional pull or traction on the turns of the film being substantially the same throughout the coil.

10. In a motion picture projection machine, a projector, mechanism for feeding the film through said projector, and a rotatable reel from which an endless film may be continuously fed to the projector and onto which it may be rewound after passing through the projector, said reel being horizontally mounted in the machine and having a flat supporting surface for a coil of film carried thereby providing relatively less area of frictional contact at any given instant between said supporting surface and said coil in the parts of the reel of greater diameter than in the parts thereof of lesser diameter.

HERBERT A. BENDFELT.

REFERENCES CITED

The following references are of record in the file of this patent:

UNITED STATES PATENTS

| Number | Name | Date |
| --- | --- | --- |
| 994,042 | Uebelmesser | May 30, 1911 |
| 1,463,992 | Adams | Aug. 7, 1923 |
| 1,639,469 | Scofield et al. | Aug. 16, 1927 |
| 1,706,296 | James | Mar. 19, 1929 |
| 2,037,601 | Shirlow et al. | Apr. 14, 1936 |
| 2,272,413 | Links et al. | Feb. 10, 1942 |
| 2,363,403 | Napoli, Jr. | Nov. 21, 1944 |
| 1,279,762 | Rossman et al. | Sept. 24, 1918 |